United States Patent
Brickell

(10) Patent No.: US 7,512,785 B2
(45) Date of Patent: Mar. 31, 2009

(54) REVOCATION DISTRIBUTION

(75) Inventor: Ernie F. Brickell, Portloand, OR (US)

(73) Assignee: Intel Corporation, Santa Clara, CA (US)

(*) Notice: Subject to any disclaimer, the term of this patent is extended or adjusted under 35 U.S.C. 154(b) by 697 days.

(21) Appl. No.: 10/622,286

(22) Filed: Jul. 18, 2003

(65) Prior Publication Data

US 2005/0015586 A1 Jan. 20, 2005

(51) Int. Cl.
*H04L 9/00* (2006.01)

(52) U.S. Cl. ............... 713/156; 713/157; 713/158; 713/173; 713/175; 713/177; 726/1; 726/2; 726/10

(58) Field of Classification Search .......... 713/155, 713/156–158, 173, 175, 177; 726/26, 27, 726/28, 29, 10, 1, 2; 380/279; 709/225, 709/227

See application file for complete search history.

(56) References Cited

U.S. PATENT DOCUMENTS

| 6,085,320 | A  | * | 7/2000  | Kaliski, Jr. ............... 713/168 |
| 6,212,634 | B1 | * | 4/2001  | Geer et al. ............... 713/156 |
| 6,922,776 | B2 | * | 7/2005  | Cook et al. ............... 713/156 |
| 2002/0056050 | A1 | * | 5/2002  | Heiden et al. ............. 713/201 |
| 2002/0184182 | A1 | * | 12/2002 | Kwan ........................ 707/1 |
| 2003/0037234 | A1 | * | 2/2003  | Fu et al. ................... 713/158 |
| 2005/0021969 | A1 | * | 1/2005  | Williams et al. .......... 713/176 |

* cited by examiner

*Primary Examiner*—Stephen Sanders
*Assistant Examiner*—Baotran N To
(74) *Attorney, Agent, or Firm*—Blakely, Sokoloff, Taylor & Zafman LLP

(57) ABSTRACT

A server registering a first party as a party relying upon a second party's certificate, revoking the second party's certificate after registering the first party, and initiating communication with the first party to indicate that the second party's certificate has been revoked.

14 Claims, 4 Drawing Sheets

REVOCATION DISTRIBUTION

BACKGROUND

In computer and communication security applications like secured financial transactions over the Internet including online banking and online shopping, public-key cryptographic systems (PKCS) are now commonly used.

In this context, there are two types of secure information interchange relevant to this patent application. First, a recipient may need to be able to verify that a message was actually sent by the person claiming to be the sender of the message and that the message was not altered by a third party in transit. This need is met by an signature-verification system. A PKCS signature-verification system allows a sender with a (private) signature key to send a message with a digital signature created using the message and the signature key. A recipient who has the sender's (public) verification key may then use the PKCS system to validate the integrity of the message and the identity of the sender.

Second, a recipient may need to be assured that even if a third party had access to the message in transit, the message was unintelligible to the third party. This need is met by a PKCS encryption-decryption system. In this mode, a PKCS system allows a recipient with a (private) decryption key to decrypt a message from a sender that is encrypted by the sender using the recipient's (public) encryption key. In actual practice, both types of uses may be combined in a single system; alternatively, a system may use a PKCS system for one application and another type of system for the other. In this background for the specification, the exposition is made in terms of signature-verification PKCS systems, but the subject matter in the case of encryption-decryption PKCS systems is analogous.

For ease of exposition consider a pair of parties termed Alice and Bob who wish to exchange information securely. Consider specifically that Alice wishes to sign messages sent to Bob and that Bob wishes to verify the digital signatures on messages received from Alice. In a first step Alice uses a PKCS to generate a signature key (a string of symbols) and a verification key. Alice may then provide the verification key to Bob and other potential recipients of her messages. To create a signed message, Alice provides the message and her signature key to the PKCS which uses her signature key and the contents of the message to generate a digital signature. A digital signature is a string of symbols that is unique for each message and signature key. The message with the digital signature attached (signed message) is then transmitted to Bob. Bob may now use Alice's verification key and the digital signature to verify that the message is from Alice and that the message was not tampered with in transit. If Bob receives a message with a signature that is verified as Alice's by Alice's verification key, he can be very confident that the digital signature was created using Alice's signature key.

In commercial and marketplace transactions, this process is complicated by the fact that Alice may not be able to provide Bob with her verification key in a trustworthy manner, for example, if Alice is a vendor on the Internet and Bob is a remote customer. Bob may therefore be hesitant to trust a verification key that is claimed to be Alice's verification key in case he is actually communicating with and using a key from a possibly malicious party masquerading as Alice. In order to solve this problem, institutions termed certificate or validation authorities (CAs or VAs) have been created to serve as trust brokers. A party wishing to communicate with other parties securely and wishing to provide the other parties with a level of trust in the party's identity, first registers its identity and public verification key with the CA which validates the party's identity before making the public verification key available to other parties. The CA is then able to provide a certificate for each registered party including at least the name of the party, the public verification key of the party and the signature of the CA itself. Alice, for example, would register herself with a CA and Bob would obtain Alice's certificate from the CA and thereby be assured that he was indeed communicating securely with Alice by using the public verification key from Alice's certificate.

Similarly, Bob may have an signature key and a certificate associated with his corresponding verification key. If the certificate is issued by a CA that Alice trusts, then Alice can use the certificate to validate the integrity of or to verify the authorship of messages that are purportedly from Bob.

A digital certificate is thus in general a statement digitally signed by a CA binding a key-holder's name to a public verification key. A certificate may also include a label for a public verification key with a label or attribute, such as a nickname, group name, account number, photo, etc. Furthermore, a certificate may authorize a key (or all keys with a given label or name) to do something. A certificate typically specifies the issuer, the subject, a public verification key, an issue date, and an expiration date. Certificates are a useful component of an infrastructure to support digital signatures.

Certificates may become invalid. Bob may change his last name and so make his existing certificates invalid, or be fired from a company, causing a certificate in which Bob is identified as a representative of the company invalid. Alternatively, Bob's signature or decryption key may be compromised or stolen therefore making the corresponding verification or encryption key in the certificate invalid. An issuer may thus wish to "revoke" a previously-issued certificate.

Periodically-issued certificate revocation lists (CRLs) are one common approach to revoking certificates. Such lists may be published by a CA and each such list specifies what unexpired certificates have been revoked, and when the next CRL will be issued. The CRL is signed by the issuer. For example, a company might issue a weekly CRL for its employee's certificates. The possibility that a relied-upon party's certificate may have been revoked requires that another party relying upon the first party must always check to ensure that the certificate has not been listed in a recent CRL. For example, before Bob uses Alice's web site to purchase a book, Bob would ideally acquire the latest CRL from Alice's CA to ensure that the certificate that Bob believes is Alice's valid certificate has not been revoked. If Bob has a CRL that does not list a recent revocation of Alice's certificate, he may for example be communicating with a malicious agent who is masquerading as Alice after improperly acquiring Alice's signature key.

DETAILED DESCRIPTION

Figure 1:
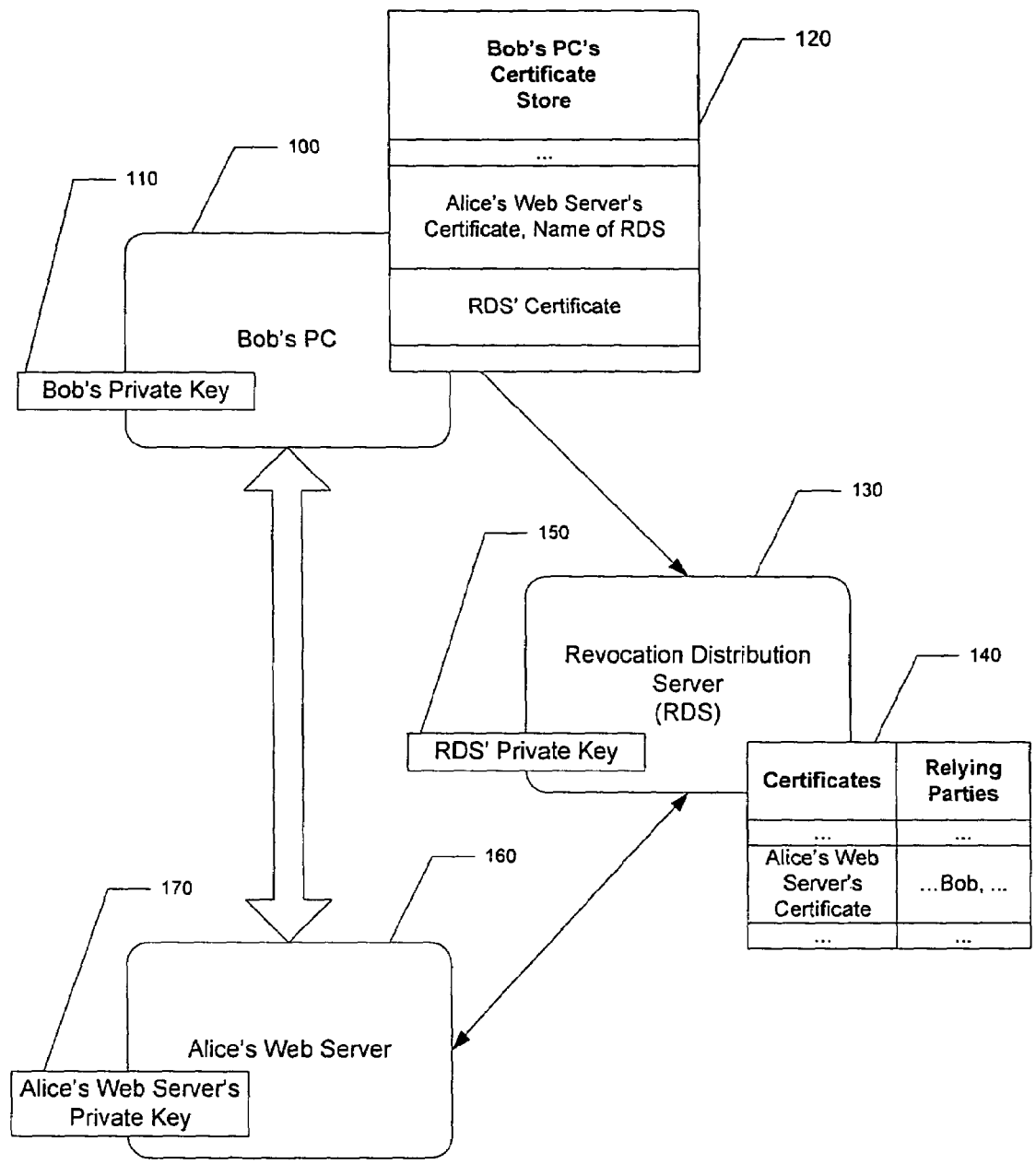
FIG. 1 depicts an overview of a revocation scenario.

FIG. 1 depicts a computer network with a Revocation Distribution Server (RDS) in one embodiment of the claimed subject matter. Referring to FIG. 1, A party exemplified by Bob may use a personal computer or PC 100 to communicate with other computers on a network, such as Alice's web server 160. In order to communicate securely with the web server, Bob uses an encryption system such as, for one example, a Secure Socket Layer (SSL) protocol. Bob's PC in this embodiment may have a web browser or another application installed that communicates with Alice's web server.

In order to trustfully communicate with Alice's web server, Bob's PC has a certificate issued by a Certificate Authority (CA) for Alice that allows Bob's PC to trust communications from Alice's server. Such certificates may be stored by the PC in a certificate store or table 120 in this embodiment of the invention. Using Alice's verification key which is part of Alice's certificate, Bob may then validate the integrity of, or verify the authorship of digitally signed messages that purport to be from Alice's server, using the signature-verification system and Alice's verification key. In an exactly analogous manner, Bob may rely on a certificate for Alice's encryption key; or Alice may rely on a certificate for Bob's verification or encryption keys.

Thus, in the above described system, Bob relies upon Alice's certificate in order to trust communications from Alice's web server. A party such as Bob is therefore termed a relying party for Alice's certificate because Bob relies upon the validity of the certificate.

In order to provide assurance to relying parties such as Bob that her certificate is always valid, Alice may in this embodiment of the claimed subject matter provide her certificate and other information to a Revocation Distribution Server (RDS) 160, enabling Bob to register as a relying party with the RDS and be notified if Alice's certificate is revoked. The RDS could then register Bob as a relying party for Alice's certificate in a table or database 140. If Alice's certificate was revoked by the RDS following a revocation request, the RDS would then communicate with Bob to inform him that Alice's certificate was revoked. This communication may be signed using the RDS' private key, which Bob's PC would verify using the RDS' certificate and the PC's certificate store 120. Bob's PC may then mark Alice's certificate as revoked or otherwise update its access controls for the web.

The high level system depicted in FIG. 1 is only one embodiment of many in accordance with the claimed subject matter. In other embodiments, Bob's and Alice's machines may both be non-server or peer client machines interacting in a peer-to-peer network, and communicating using protocols other than web transfer protocols. In some embodiments, the RDS may actually be the same physical system as either Bob's or Alice's machine. In other embodiments, the RDS may provide revocation services for multiple certificates for Alice. Of course, in a symmetric manner, the RDS may provide revocation services for parties relying on Bob's certificate as well.

Furthermore the use of the terms PC and server in describing this embodiment does not limit the nature or types of devices on which a system embodying the claimed subject matter may be implemented. Bob's or Alice's machine may be a mobile processor based device such as a laptop, tablet or notebook computer; a Personal Digital Assistant or Pocket PC; or a "smart" cell phone, to name a few possibilities. The communication between the RDS and the other parties on the network may occur over the Internet, a wireless network, fiber optic network, or an Ethernet using a variety of networking protocols.

It is important to reiterate that the use of the hypothetical parties "Alice" and "Bob" for exposition is not meant to restrict the number or identities of the parties using an RDS embodying the claimed subject matter. Each of these entities could be, for example, corporations, universities, or other organizations, or could be computing devices such as servers or other computers. In a situation where an entity is a computing device, all key generation, including the creation of private keys such as signature or decryption keys, may be performed automatically without human intervention. Furthermore, many entities may participate in a network served by one or more revocation distribution servers. In such networks, Bob or any relying party would need to register with all revocation distribution servers that may have a certificate on which the party relies.

Figure 2:
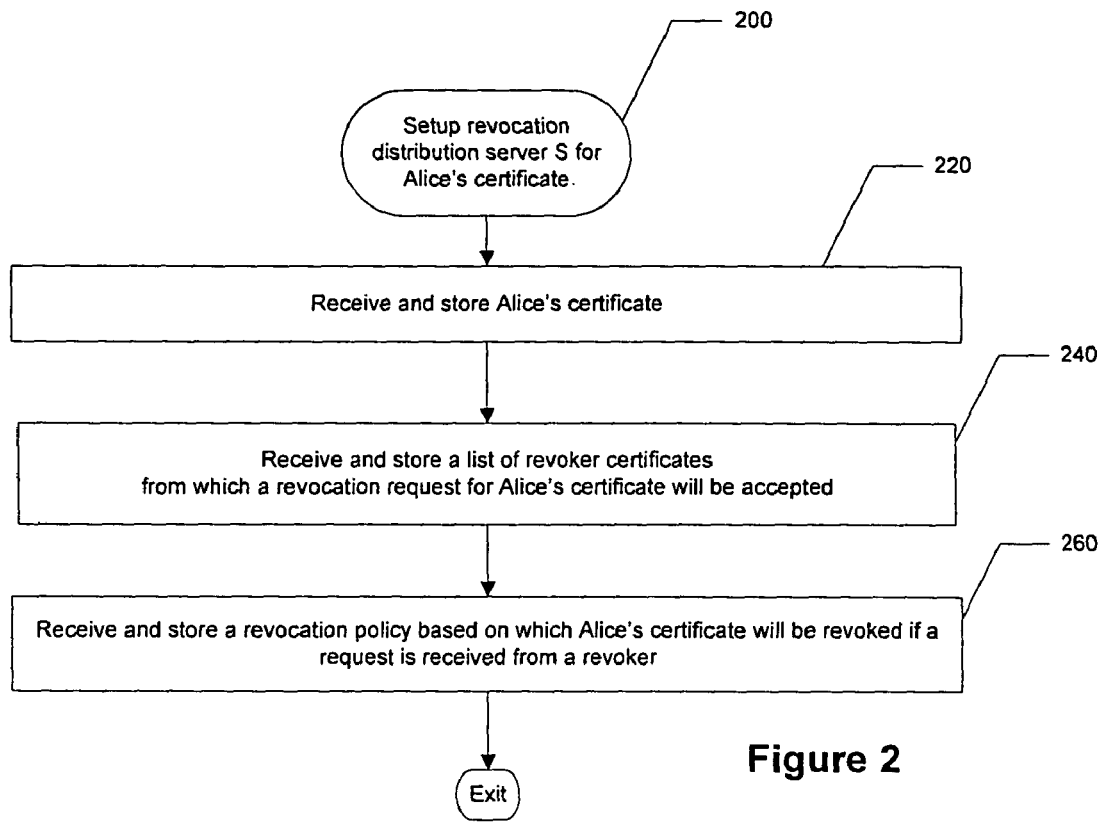
FIG. 2 depicts steps to set up a revocation distribution server.

Returning to the simple exemplary embodiment in FIG. 1, the steps of the associated processes are now described, starting with FIG. 2, which is a flowchart depicting the high level set up process for the RDS. In the first step 220 in FIG. 2, the RDS receives and stores Alice's certificate. This certificate itself may be issued by a Certificate Authority. Along with the certificate, the RDS receives information about a revocation request reception policy for accepting revocations requests for the certificate, such as that depicted in step 240. The policy depicted in this example is that a revocation request for Alice's certificate may be a message signed by one of a list of revokers whose certificates are also stored in a list of authorized revokers for Alice's certificate. In many instances, Alice's certificate itself would in the list of authorized revokers stored at the RDS. In one embodiment, the RDS could store serial numbers or other identifiers for the certificates instead of the certificates themselves. When a revoker submitted a revocation request, it would then include the certificate of the revoker. In another embodiment, each revoking entity may receive an authorization certificate from the RDS or from another authority that authorizes that entity as a revoker for Alice's certificate. This authorization certificate would be submitted with the revocation request, and the RDS would check the authorization certificate. As indicated above, there are many different mechanisms by which the RDS may validate that a revocation request meets the policy, and the above list is only exemplary. In general, the RDS receives a revocation request, and validates by some process that it meets the policy before revoking Alice's certificate.

In addition to requiring the receipt of a request from a certified revoker, there may be other processing required before the RDS actually revokes Alice's certificate. This processing may include, for example, requesting a confirmation from the revocation requestor; notifying Alice or Alice's employer that a revocation is about to occur; and checking to see that the revocation requestor's certificate itself is valid. All of these checks and requirements constitute a revocation policy which is stored in association with Alice's certificate on the RDS as in step 260.

Once a revocation request has been received at the RDS and is determined to be valid and in accordance with the revocation policy, a message is sent to those users registered as relying on the certificate that the certificate has been revoked.

Figure 3:
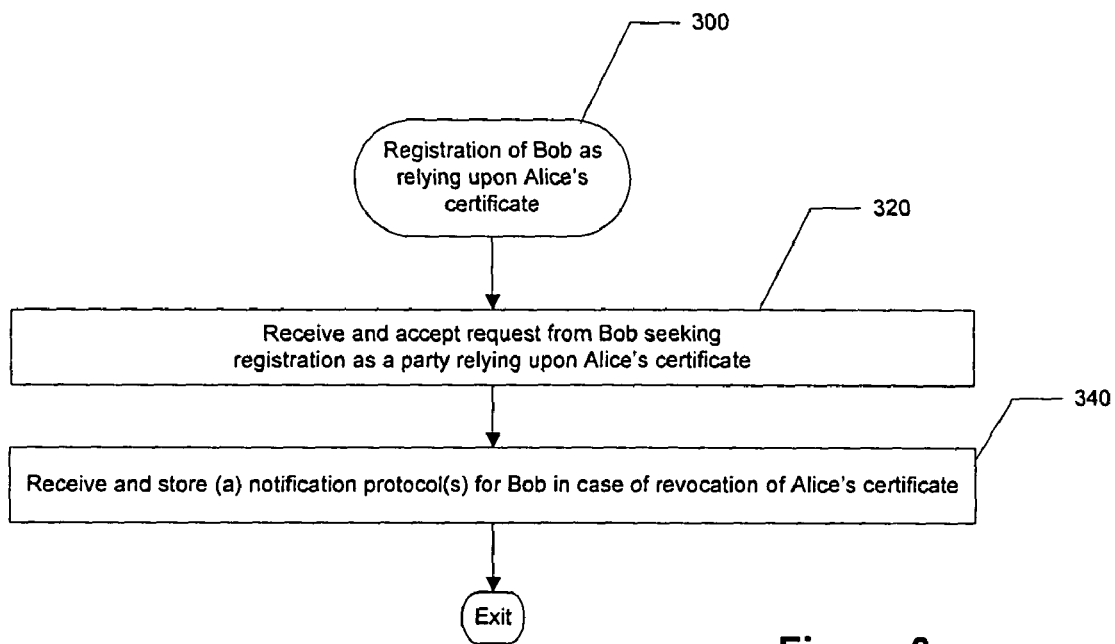
FIG. 3 depicts steps to register a relying party.

The process of registering a relying party for a certificate in one embodiment of the claimed subject matter is depicted in FIG. 3. A party such as Bob may request registration as a party relying on Alice's certificate with the RDS as in step 320. The RDS then stores in addition to the registration, a notification protocol for Bob or a machine associated with Bob or designated by Bob in case Alice's certificate is revoked, in step 340.

Figure 4:
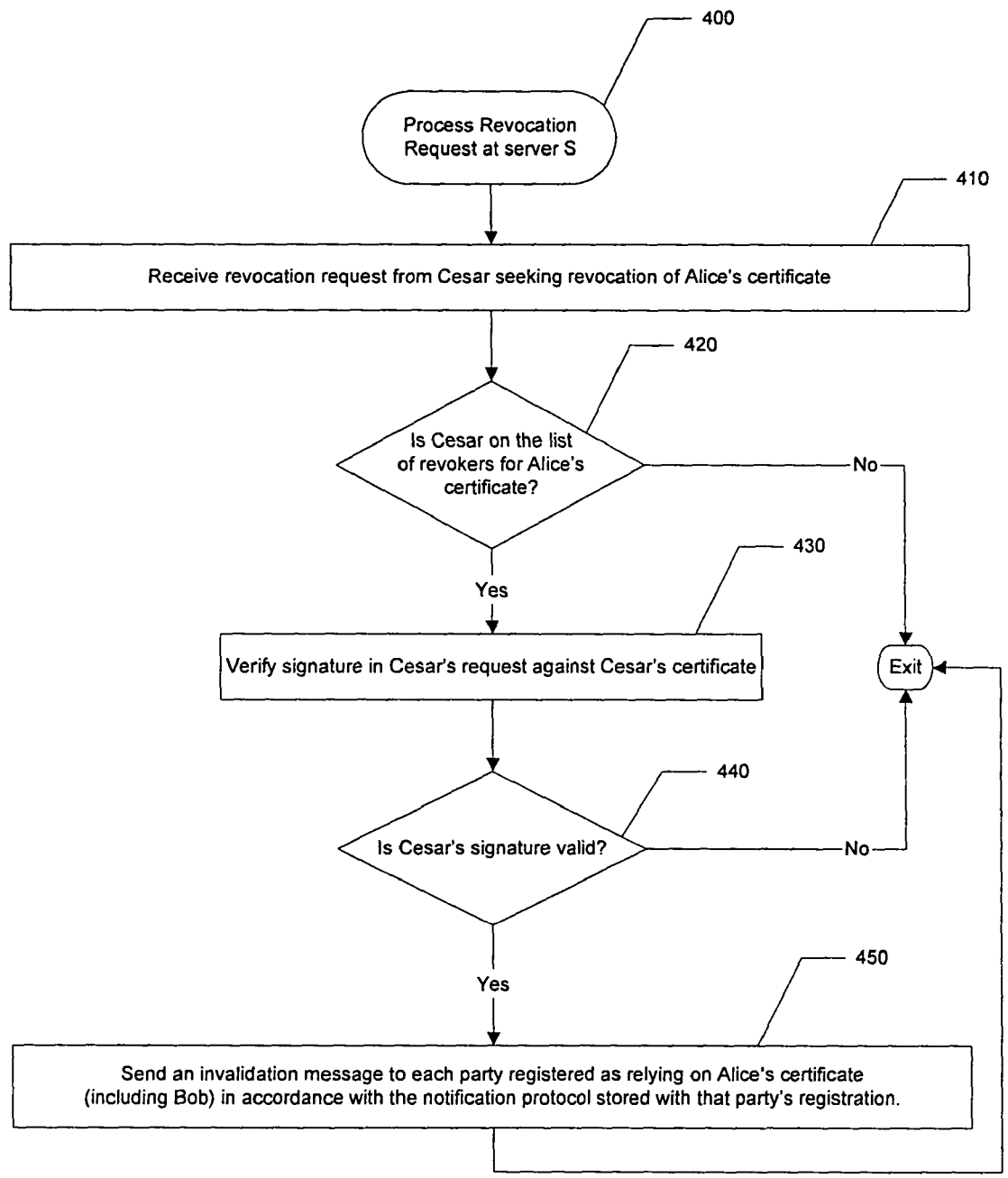
FIG. 4 depicts steps to process a revocation request at the server.

FIG. 4 depicts the processing at an RDS to process a revocation request in an example of one embodiment of the claimed subject matter. In step 410, a revocation request is received from a third party, named Cesar for ease of exposition, seeking revocation of Alice's certificate. The RDS first validates the request in accordance with a revocation policy stored in association with Alice's certificate, in this example by checking if Cesar is on a list of revokers for Alice's certificate in step 420, verifying a signature in Cesar's request against the certificate in step 430 and rejecting it if the signature is invalid in step 440. Other steps may take place in other embodiments to satisfy a more elaborate revocation policy. In the example of FIG. 4, the validity of Cesar's revocation request is sufficient to cause the RDS to send a revocation message to each party registered as relying on Alice's certificate in step 450. If Bob has been registered as a relying party for Alice's certificate as in FIG. 3, Bob or a machine associated with or designated by Bob will be notified by an invalidation message in accordance with a stored notification protocol in step 450.

As indicated above, the identity of the revoking party (Cesar) is exemplary. In practice, the revoking party may be any of the parties involved in the example, such as Alice herself, or Bob, if those parties are listed as revokers for Alice's certificate, or an entity including, for example, Alice's employer or a CA.

Figure 5:
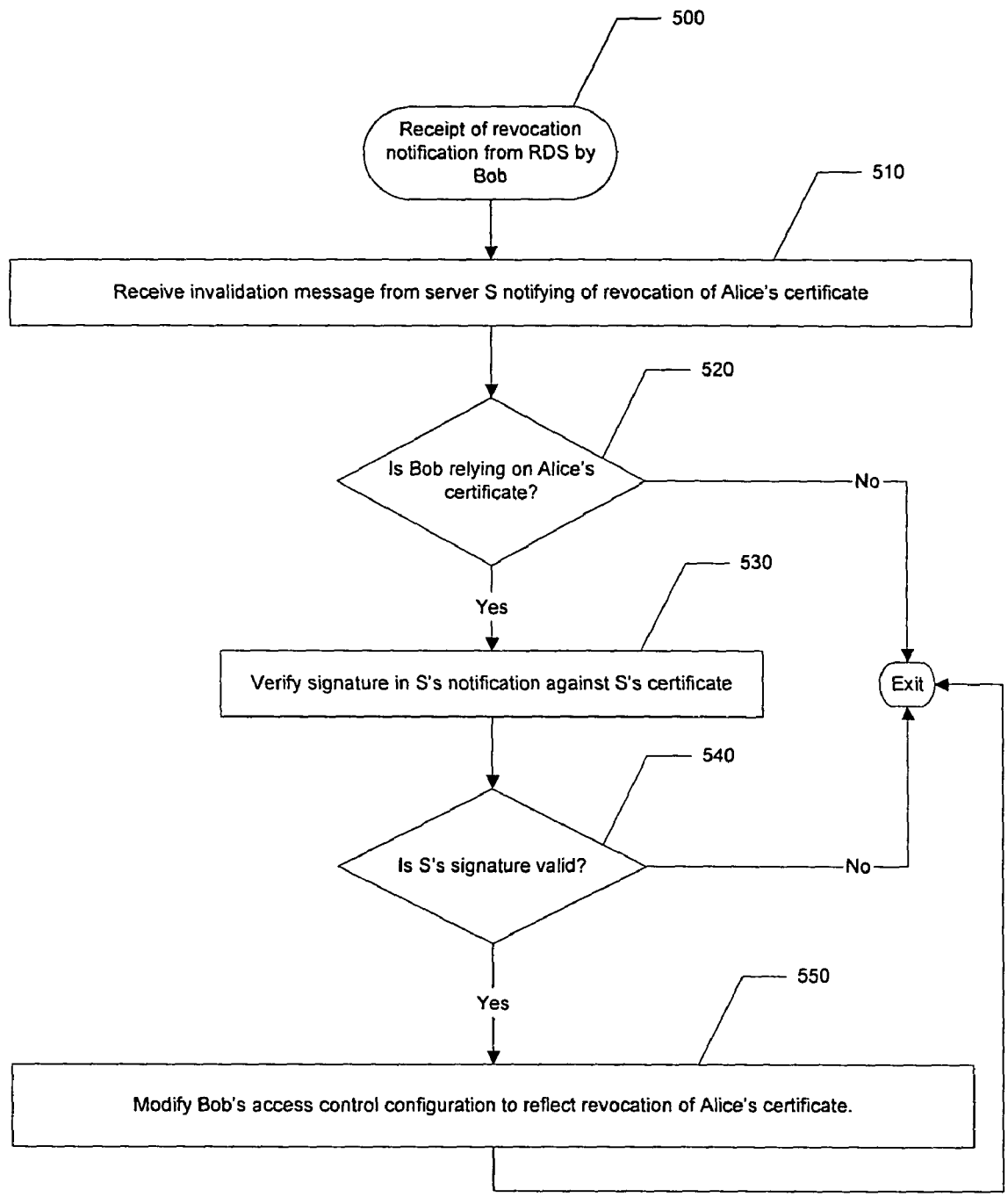
FIG. 5 depicts steps to process an invalidation message at the user's computer.

FIG. 5 shows one example of what may occur when a relying party such as Bob or a machine associated with Bob receives an invalidation notification from an RDS. On receipt of the notification in step 510, first, the sending server is validated as a server with which Bob has registered as a relying party for Alice's certificate in step 520. The message from the RDS is then verified using its signature and a stored certificate at Bob's machine, steps 530-540. Once the invalidation message has been verified, Bob's machine is then reconfigured in step 550 to reflect the revocation of Alice's certificate.

Various alternatives of the invalidation notification that occurs on revocation of Alice's certificate are possible. In some embodiments, Bob may actually receive an email message from the RDS and be required to manually modify settings on his machine. In other embodiments, Bob's machine may be set up to automatically execute steps such as those depicted in FIG. 5 after receiving a direct invalidation message, for example over a specially designated UDP port agreed upon with the server which it is always monitoring. Modification of access control on Bob's machine may also take various forms, including the marking of Alice's certificate as revoked, or switching to another valid certificate for Alice. Finally, Bob's machine may not be a single machine but itself be a server such as a proxy server or gateway, so that the revocation takes effect not only at one machine but at a network of machines that rely on Alice's certificate.

Finally, though the use of PKCS signature-verification systems has been used as an ongoing example throughout the text above, it should be noted that the claimed subject matter is not limited to those types of systems but encompasses broadly any type of certificate for secure communication that is subject to revocation.

The present invention includes various steps. The steps of the present invention may be performed by hardware devices, or may be embodied in machine-executable instructions, which may be used to cause a general-purpose or special-purpose processor or logic circuits programmed with the instructions to perform the steps. Alternatively, the steps may be performed by a combination of hardware and software. The present invention may be provided as a computer program product that may include a machine-readable medium having stored thereon data which when accessed by a machine may cause the machine to perform a process according to the present invention. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
registering a first party and a second party with a database at a server, wherein the first party is registered as a party relying on a digital certificate of the second party;
receiving a request to revoke the digital certificate of the second party after registering the first party;
authenticating the request in accordance with a pre-defined authenticating policy associated with the digital certificate of the second party, and generating an authorization certificate by a revoker of digital certificates, wherein the authentication certificate is associated with the request to ensure the request is authenticated in accordance with the pre-defined authentication policy, the authentication of the request including verifying a digital signature incorporated in the request with a list of the digital certificates previously defined as revoker certificates for a website;
sending the authorization certificate to the first party, wherein the first party to receive the authorization certificate;
revoking the digital certificate of the second party in accordance with a revocation policy; and
initiating communication with the first party to indicate that the digital certificate has been revoked, wherein the communication includes notifying the first party that the digital certificate of the second party has been revoked, wherein the notification is further sent to other parties registering with the database as relying on the digital certificate of the second party.

2. The method of claim 1, wherein initiating communication with the first party further comprises sending a revocation message to a machine that is associated with the first party.

3. The method of claim 2 further comprising verifying authenticity of the revocation message and modifying access control information to indicate the revocation of certificate of the second party.

4. The method of claim 1, wherein receiving the request to revoke the digital certificate of second party comprises accepting the request by authenticating a signature incorporated in the request with the revoker certificate.

5. The method of claim 1, further comprising sending an email message to an email address for the first party.

6. A system comprising:
a server having an integrated circuit coupled with a storage medium via a bus, the server further having a registration database to register a first party and a second party, wherein the first party is registered as a relying party for a digital certificate of the second party, the server to:
receive a request to revoke the digital certificate of the second party after registering the first party;
authenticate the request in accordance with a pre-defined authenticating policy associated with the digital certificate of the second party, and generating an authorization certificate by a revoker of digital certificates, wherein the authentication certificate is associated with the request to ensure the request is authenticated in accordance with the pre-defined authentication policy, the authentication of the request including verifying a digital signature incorporated in the request with a list of the digital certificates previously defined as revoker certificates for a website;
send the authorization certificate to the first party, wherein the first party to receive the authorization certificate;
revoke the digital certificate of the second party in accordance with a revocation policy; and
initiate communication to indicate to the first party that the digital certificate of the second party has been revoked, wherein the communication includes notifying the first party that the digital certificate of the second party has been revoked, wherein the notification is further sent to other parties registering with the database as relying on the digital certificate of the second party.

7. The system of claim 6, wherein the server is further to send a revocation message to a machine that is associated with the first party.

8. The system of claim 6, wherein the server is further to accept the request by authenticating a signature incorporated in the request with the revoker certificates certificate.

9. The system of claim 6, wherein the server is further to send an email message to an email address for the first party.

10. A machine-readable storage medium comprising instructions which, when executed, further cause a machine to:
register a first party and a second party with a database at a server, wherein the first party is registered as a party relying on a digital certificate of the second party;
receive a request to revoke the digital certificate of the second party after registering the first party;
authenticate the request in accordance with a pre-defined authenticating policy associated with the digital certificate of the second party, and generating an authorization certificate by a revoker of digital certificates, wherein the authentication certificate is associated with the request to ensure the request is authenticated in accordance with the pre-defined authentication policy, the authentication of the request including verifying a digital signature incorporated in the request with a list of the digital certificates previously defined as revoker certificates for a website;
send the authorization certificate to the first party, wherein the first party to receive the authorization certificate
revoke the digital certificate of the second party in accordance with a revocation policy; and
initiate communication with the first party to indicate that the digital certificate of the second party has been revoked, wherein the communication includes notifying the first party that the digital certificate of the second party has been revoked, wherein the notification is further sent to other parties registering with the database as relying on the digital certificate of the second party.

11. The machine-readable storage medium of claim 10, wherein initiating of the communication with the first party further comprises sending a revocation message to a machine that is associated with the first party.

12. The machine-readable storage medium of claim 11, further comprising the machine associated with the first party verifying the authenticity of the revocation message and modifying access control information of the machine to indicate the revocation of the digital certificate.

13. The machine-readable storage medium of claim 10, wherein receiving the request to revoke the digital certificate comprises accepting the request by authenticating a signature incorporated in the request the revoker certificate.

14. The machine-readable storage medium of claim 10, wherein the initiating of the communication with a first party further comprises sending an email message to an email address for the first party.

* * * * *